United States Patent
Connor et al.

(10) Patent No.: US 12,257,659 B2
(45) Date of Patent: Mar. 25, 2025

(54) WASTE COLLECTION AND ABATEMENT DURING HYBRID ADDITIVE AND SUBTRACTIVE MANUFACTURING

(71) Applicant: MANTLE INC., San Francisco, CA (US)

(72) Inventors: Stephen T. Connor, San Francisco, CA (US); Fabio Zurcher, San Francisco, CA (US); Brad Eaton, San Francisco, CA (US); Matthew McKay, Palo Alto, CA (US)

(73) Assignee: MANTLE INC., San Francisco, CA (US)

(*) Notice: Subject to any disclaimer, the term of this patent is extended or adjusted under 35 U.S.C. 154(b) by 382 days.

(21) Appl. No.: 17/489,673

(22) Filed: Sep. 29, 2021

(65) Prior Publication Data
US 2022/0097190 A1    Mar. 31, 2022

Related U.S. Application Data

(60) Provisional application No. 63/085,079, filed on Sep. 29, 2020.

(51) Int. Cl.
*B23Q 11/00*    (2006.01)
*B22F 12/90*    (2021.01)
(Continued)

(52) U.S. Cl.
CPC .......... *B23Q 11/0046* (2013.01); *B22F 12/90* (2021.01); *B23Q 17/2433* (2013.01);
(Continued)

(58) Field of Classification Search
CPC ....... G05B 2219/37588; Y10T 29/5176; Y10T 408/50; Y10T 409/30392;
(Continued)

(56) References Cited

U.S. PATENT DOCUMENTS 3,880,047 A * 4/1975 Dosier ............... B23Q 11/0046
409/137
4,340,326 A * 7/1982 Buonauro ............. B23B 49/001
451/6

(Continued)

FOREIGN PATENT DOCUMENTS

CN     105935808 A  *  9/2016
DE   102008015761 A1 * 10/2009 ............... B28D 1/14
(Continued)

OTHER PUBLICATIONS

Andoni, Lasa Goni (EP Examiner), "Extended European Search Report," issued Sep. 19, 2024 in corresponding EP Application No. 21876306.8, 6 pages.

(Continued)

*Primary Examiner* — Aneeta Yodichkas
*Assistant Examiner* — Michael Vitale
(74) *Attorney, Agent, or Firm* — MH2 Technology Law Group LLP

(57) ABSTRACT

An assembly for controlling waste material during a hybrid subtractive and additive manufacturing process is disclosed, including a machining tool held in a holder, a shroud disposed around the machining tool, and one or more ports configured to create a negative pressure within the shroud. A method of constraining waste material during a hybrid subtractive and additive manufacturing process of a part includes adding an amount of material to a part being additively manufactured, transforming the amount of material that was added, manipulating a tool to machine a portion of the part being additively manufactured and generating a waste material, sealing a portion of the tool and covering a portion of the part with a shroud, and applying a negative pressure to create an airflow to prevent the waste material from exiting the shroud.

22 Claims, 8 Drawing Sheets

(51) Int. Cl.
  *B23Q 17/24*    (2006.01)
  *B29C 64/35*    (2017.01)
  *B33Y 40/00*    (2020.01)

(52) U.S. Cl.
  CPC .......... *B29C 64/35* (2017.08); *B23C 2230/08* (2013.01); *B33Y 40/00* (2014.12); *G05B 2219/37588* (2013.01); *Y10T 29/5176* (2015.01); *Y10T 409/304088* (2015.01)

(58) Field of Classification Search
  CPC ........... Y10T 409/304088; B22F 12/90; B23C 2230/00–08; B23B 2270/30; B23B 2270/62; B23Q 11/0042–0075; B23Q 11/078–0891; B23Q 17/24–2495; B29C 64/35
  USPC ...................... 409/134, 137; 408/67; 29/56.5
  See application file for complete search history.

(56) References Cited

U.S. PATENT DOCUMENTS

| | | | | |
|---|---|---|---|---|
| 4,471,444 | A * | 9/1984 | Yee | G05B 19/4065 73/104 |
| 4,915,550 | A * | 4/1990 | Arai | B23Q 3/069 409/137 |
| 6,059,494 | A * | 5/2000 | Susnjara | B23Q 17/2404 409/137 |
| 9,387,563 | B2 * | 7/2016 | Okamoto | B23Q 11/0891 |
| 9,849,554 | B2 * | 12/2017 | Sodemann | G06T 7/0004 |
| 2005/0019122 | A1 * | 1/2005 | Kado | B23Q 11/0046 409/137 |
| 2013/0133781 | A1 * | 5/2013 | Suoniemi | B65B 1/28 141/67 |
| 2016/0184945 | A1 * | 6/2016 | Saitou | B23Q 17/2476 414/222.02 |
| 2016/0339556 | A1 * | 11/2016 | Sodemann | B23Q 11/0075 |
| 2017/0144262 | A1 | 5/2017 | Okuda | |
| 2017/0327701 | A1 | 11/2017 | Connor et al. | |
| 2019/0039198 | A1 | 2/2019 | Sugiura | |
| 2019/0196454 | A1 * | 6/2019 | Tarui | G06N 3/08 |
| 2020/0147687 | A1 | 5/2020 | Connor et al. | |
| 2020/0238566 | A1 | 7/2020 | Lin et al. | |
| 2020/0254691 | A1 | 8/2020 | Mamrak et al. | |
| 2020/0262143 | A1 | 8/2020 | Gibson | |

FOREIGN PATENT DOCUMENTS

| | | | | |
|---|---|---|---|---|
| JP | 62246455 | A * | 10/1987 | |
| JP | 2001062665 | A * | 3/2001 | ......... B23Q 11/0046 |
| JP | 2002144188 | A * | 5/2002 | |
| JP | 2010134776 | A * | 6/2010 | |
| JP | 2016120589 | A | 7/2016 | |
| RU | 2158669 | C2 * | 11/2000 | |
| RU | 2729279 | C1 | 8/2020 | |
| WO | 02/073325 | A2 | 9/2002 | |
| WO | 02/073325 | A3 | 9/2002 | |
| WO | 2018/141972 | A1 | 9/2018 | |
| WO | 2018/193306 | A2 | 10/2018 | |

OTHER PUBLICATIONS

PCT Notification Concerning Transmittal of International Preliminary Report on Patentability mailed Apr. 13, 2023 in corresponding international Application No. PCT/US2021/052429, 8 pages.

PCT Notification of Transmittal of the International Search Report and the Written Opinion of the International Searching Authority, or the Declaration mailed Jan. 13, 2022 in corresponding international Application No. PCT/US2021/052429, 4 pages.

* cited by examiner

WASTE COLLECTION AND ABATEMENT DURING HYBRID ADDITIVE AND SUBTRACTIVE MANUFACTURING

CROSS REFERENCE TO RELATED APPLICATIONS

This application claims the benefit of U.S. Provisional Application 63/085,079 filed Sep. 29, 2020, the entire disclosure of which is incorporated by reference herein.

FIELD OF THE DISCLOSURE

The present disclosure relates to the field of hybrid additive and subtractive manufacturing used to fabricate intricate parts made of metals and other materials.

BACKGROUND

Hybrid combinations of additive manufacturing and subtractive manufacturing provide significant advantages while mitigating negative aspects of either technology. For example, additive manufacturing allows building a part beginning from the inside of the part's design which would not be accessible from the outside perspective of subtractive technologies like machining. This allows new monolithic part geometries with features like internal cooling channels and hollow web cores. However, additively manufactured parts typically can have only near net final shapes and exhibit some degree of unwanted roughness because parts are built in discrete layers which intrinsically cannot adhere to final net shape or produce the desirable finished surfaces possible in subtractive fabrication. In U.S. Pat. No. 10,087,332 B2, Connor et. al. teach subtractive steps such as machining between sinterable metal paste additive steps in an overall additive process to achieve a final net shape. Since some surfaces might not be reachable by a suitable subtractive process once the part is in completed form, it is advantageous to perform subtractive steps between some of the additive steps before the part is completed. However, the subtractive step in hybrid manufacturing produces waste material, or swarf, in forms including chips, filings, turnings, shavings, and various fine particulate matter such as dust, smoke, vapors, and condensates. This swarf, or waste material can redeposit on the part in addition to interfering with the process machine and causing potential environmental and human health hazards. Particulate material must not be permitted to build up on the part prior to an additive step as it may change the density of the completed part; interfere with adherence of the next added layer; and allow difficult to remove masses of swarf to become trapped in a completed part requiring post processing removal. Particulate matter may migrate from the build area to other parts of the fabrication apparatus; also fine particulate matter may be pyrophoric or toxic to people and the environment. Therefore, it is required to remove and abate waste generated during the subtractive step.

It is therefore desirable for methods and assemblies to abate unwanted waste material during a hybrid additive and subtractive manufacturing process.

SUMMARY OF THE INVENTION

The following presents a simplified summary in order to provide a basic understanding of some aspects of one or more embodiments of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

An assembly for controlling waste material during a hybrid subtractive and additive manufacturing process is disclosed. The assembly for controlling waste material during a hybrid subtractive and additive manufacturing process also includes a machining tool held in a holder or a machining tool shaped to function also as a holder and fit to a tool actuator. The assembly for controlling waste material during a hybrid subtractive and additive manufacturing process also includes a shroud disposed around the machining tool or machining tool shaped to function also as a holder and a portion of the machining tool. The assembly for controlling waste material during a hybrid subtractive and additive manufacturing process also includes one or more ports configured to create a negative pressure within the shroud.

Implementations may include one or more of the following features. The assembly for controlling waste material during a hybrid subtractive and additive manufacturing process may include where the one or more ports are connected to a source of pressurized air by one or more throttling valves and a controller that controls a rate of evacuation. The assembly may include a camera connected to the controller to detect buildup of swarf. The controller, based on detection of buildup of swarf by the camera, is configured to adjust flow of the pressurized air through selected ones of the one or more ports. The assembly may include a collector connected to the one or more ports by a conduit and configured to collect, sort, and release swarf. The collector may include a magnetic mass detection chamber. The collector may include a filtration swarf collection chamber. The collector may include a gravitational swarf collection chamber. The assembly may include a particle detection chamber having one or more sensors configured to detect in real time a concentration, a size, a shape, and/or a concentration of the swarf. The one or more sensors are connected to the controller, and the controller may be configured to adjust the one or more throttling valves in the port. The shroud may include the one or more ports. The holder may include the one or more ports. The shroud, the tool, and a holder are configured to hold a part being additively manufactured may include a swappable assembly. The assembly may include a seal disposed between the portion of the shroud and a portion of the machining tool holder.

An assembly for controlling waste material during a hybrid subtractive and additive manufacturing is also disclosed. The assembly for controlling waste material also includes a machining tool held in a holder or a machining tool shaped to function also as a holder and fit to a tool actuator. The assembly for controlling waste material also includes a shroud disposed around the machining tool or machining tool shaped to function also as a holder and a portion of the machining tool. The assembly for controlling waste material also includes one or more ports connected to a source of pressurized air by one or more throttling valves configured to create a negative pressure within the shroud. The assembly for controlling waste material also includes a controller that controls a rate of evacuation within the shroud and is configured to adjust flow of the pressurized air through selected ones of the one or more ports. The assembly for controlling waste material also includes a camera connected to the controller to detect buildup of swarf.

A method of constraining waste material during a hybrid subtractive and additive manufacturing process of a part is also disclosed. The method of constraining waste material also includes adding an amount of material to a part being additively manufactured. The method may also include transforming the amount of material that was added. The method may include manipulating a tool to machine a portion of the part being additively manufactured and generating a waste material/swarf. The method may include sealing a portion of the tool and covering a portion of the part being additively manufactured with a shroud. The method may include applying a negative pressure via a port in the shroud to create an airflow to prevent the swarf from exiting the shroud.

The method of constraining waste material during a hybrid subtractive and additive manufacturing process may include detecting a build up of swarf by a camera. The adjusting of air flow may be based on the build up of swarf detected by the camera. The method may include determining, within a collector, a concentration, a size, a shape, and/or a concentration of the swarf. The collector may include a magnetic mass detection chamber, a gravitational swarf collection chamber, a filtration collection chamber, or a combination thereof. The method of constraining waste material may include monitoring in real time, by a detection system may include sensors, a rate, a quantity and/or a type of swarf collected. The swarf generation model may be based on calculated and/or measured quantities of materials added and/or subtracted from the part. The method of constraining waste material may include determining an operating margin using a set of required air flow rates calculated based on the expected swarf generation rates, the swarf generation model, a mechanical arrangement of the shroud, or a combination thereof. The method of constraining waste material may include adjusting the airflow and the swarf generation models based on detection of swarf outside of the operating margin. The method may include raising an alarm based on detection of swarf outside of the operating margin. The air flow in the method of constraining waste material directed toward the part. One or more nozzles, one or more conduits, or the one or more ports may be located in the shroud.

BRIEF DESCRIPTION OF THE DRAWINGS

The accompanying drawings, which are incorporated in and constitute a part of this specification, illustrate embodiments of the present teachings and together with the description, serve to explain the principles of the disclosure. In the figures.

It should be noted that some details of the figures have been simplified and are drawn to facilitate understanding of the present teachings rather than to maintain strict structural accuracy, detail, and scale.

DETAILED DESCRIPTION

Reference will now be made in detail to the present embodiments (exemplary embodiments) of the invention, examples of which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

While the invention has been illustrated with respect to one or more implementations, alterations and/or modifications can be made to the illustrated examples without departing from the spirit and scope of the appended claims. In addition, while a particular feature of the invention may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." The term "at least one of" is used to mean one or more of the listed items can be selected.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

Figure 1:
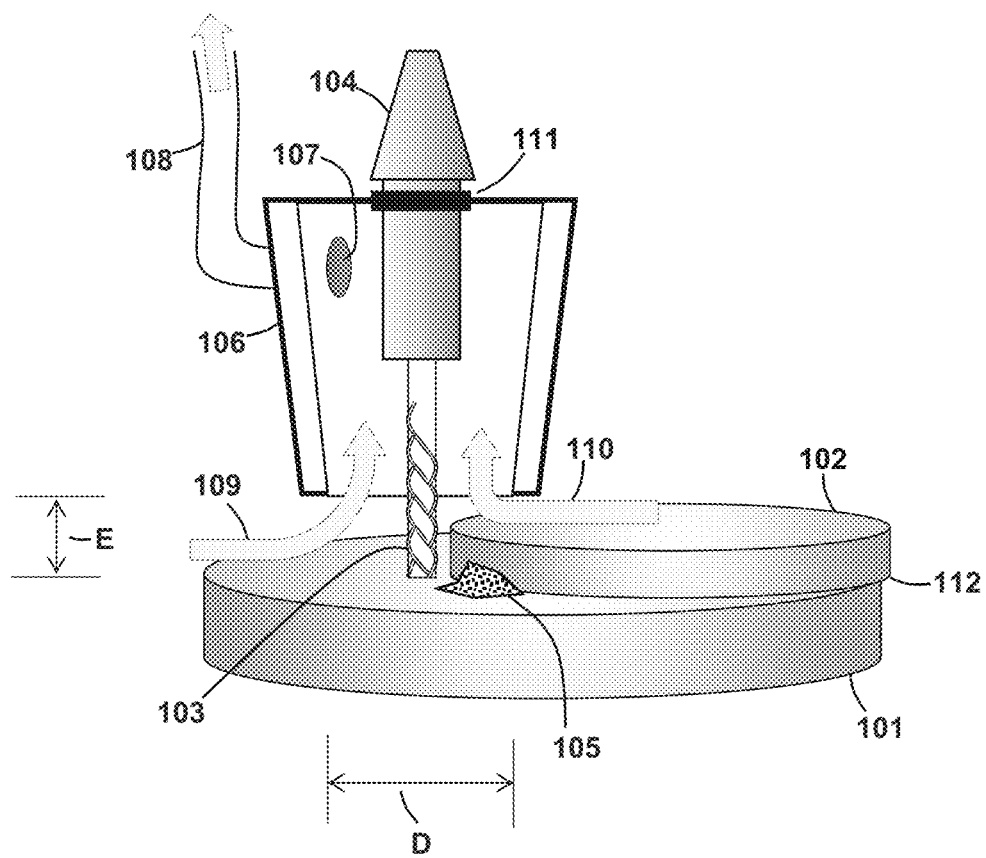
FIG. 1 depicts a part undergoing a subtractive step of machining with swarf collection.

In one embodiment, depicted in FIG. 1, a part is undergoing a subtractive step by machining during a hybrid additive and subtractive process. A bottom portion 101 of a part has been added by dispensing a sinterable metal paste, transformed into a densified bound green body by drying away volatile solvents, and manipulated into a final form by a machining process. Although a sinterable metal paste is described here, the additive step may refer to any additive step including, but not limited to, extruding, dispensing, depositing, printing, jetting, and placing. Likewise, the added materials may include, but are not limited to, metals, metal alloys, oxides, sulfides, nitrides, pnictides, polymers and various ceramics. A top portion 102 of the part has been added by dispensing metal paste and transformed by drying although the drying could be replaced by the transformative step appropriate to the additive step and added material including, but not limited to, removing, drying, evaporating, sublimating, curing, reacting, oxidizing, coating, baking, diffusing, implanting, freezing and polymerizing. A machining tool 103 is driven by a spindle through a machining tool holder 104 in order to manipulate by machining top portion 102. The manipulation could be any manipulative step appropriate to the material, the additive step, and the transformative step including, but not limited to, milling, cutting, grinding, sanding, polishing, burnishing, etching, and ablating. In the case of dried metal paste, the top portion will tend toward being friable and the swarf, which may also be referred to as waste material, will typically be in the form of fine metal particles and small clusters of particles partially prone to becoming easily suspended in an airborne cloud near the work area and eventually settling widely and partially settling on the surfaces of bottom portion 101 and top portion 102 of the part near the area as shown by settled cluster 105. Note that neither widely settled particles nor clusters of particles are desired and may be advantageously removed. In the presently described embodiment, a shroud 106 wraps around upper portion of tool 103 and lower portion of holder 104 on all sides except adjacent and near to top portion 102 of the part thereby constraining all air flow past the spindle to a small area at the bottom of the shroud. Application of a negative pressure relative vacuum at a first port 107 via a conduit 108 will create negative pressure inside the shroud 106 which in turn creates airflows 109 and 110 adjacent and around the part and thereby removing swarf as the swarf becomes entrained within the airflows. Thus, shroud 106 is used to facilitate the collection and removal of swarf generated during the manipulation process. Shroud 106 is sealed by motional seal 111 around tool holder 104 such that rotational motion, and optionally linear motion, of the tool holder is allowed but air flow past the seal is not allowed. Importantly the seal 111 should not permit the flow of swarf out of the shroud and toward other parts of the machine such as the spindle. In one embodiment both shroud 106 and seal 111 may open in roughly two pieces to allow for automatic tool changing and then be able to close again sealed. Alternatively, the spindle may rise out of the shroud, or the shroud may drop down for automatic tool changing and it will be understood by a person skilled in the art that other ways to change a tool through the shroud are included within the bounds of this disclosure. In certain embodiments, the machining tool 103 may be held in a holder 104 or a machining tool shaped to function also as a holder and fit to a tool actuator may be included.

It will be of note, as shown in FIG. 1, that due to the variable nature of the part under fabrication, the gap between the shroud 106 and the part where flow 110 traverses is less than the gap between the shroud and the part where flow 109 traverses and this will result in lower velocity and higher volume for flow 109 and higher velocity but lower volume for flow 110. This difference will be most accentuated near the edge of the part or overhangs 112 where generally about half of the opening of the roughly cylindrical shroud will not be adjacent to the part. It is therefore advantageous to properly size the circular opening of the shroud 106 shown in FIG. 1 as a diameter D in relation to the total flow via the first port 107 and conduit 108, the size of tool 103, and extension of tool 103 beyond the opening of the shroud given as distance E in FIG. 1. The ratio of D to E, i.e. D/E, is advantageous to capturing particles when it is from about 0.025 to about 4.0 and optimal when it is from about 0.75 to about 2.0. In the case where the shroud opening varies significantly from circular in shape, advantageous and optimal ranges for D/E will differ as will be apparent to a person of sufficient skill.

In another embodiment, shroud 106, tool 103, seal 111, and holder 104 form a swappable assembly with all components and dimensions chosen to optimize collection of the type, quantity, and velocity of the swarf produced by the particular tool chosen for the assembly. In this way swarf collection may be always run under optimal conditions without compromise.

Figure 2:
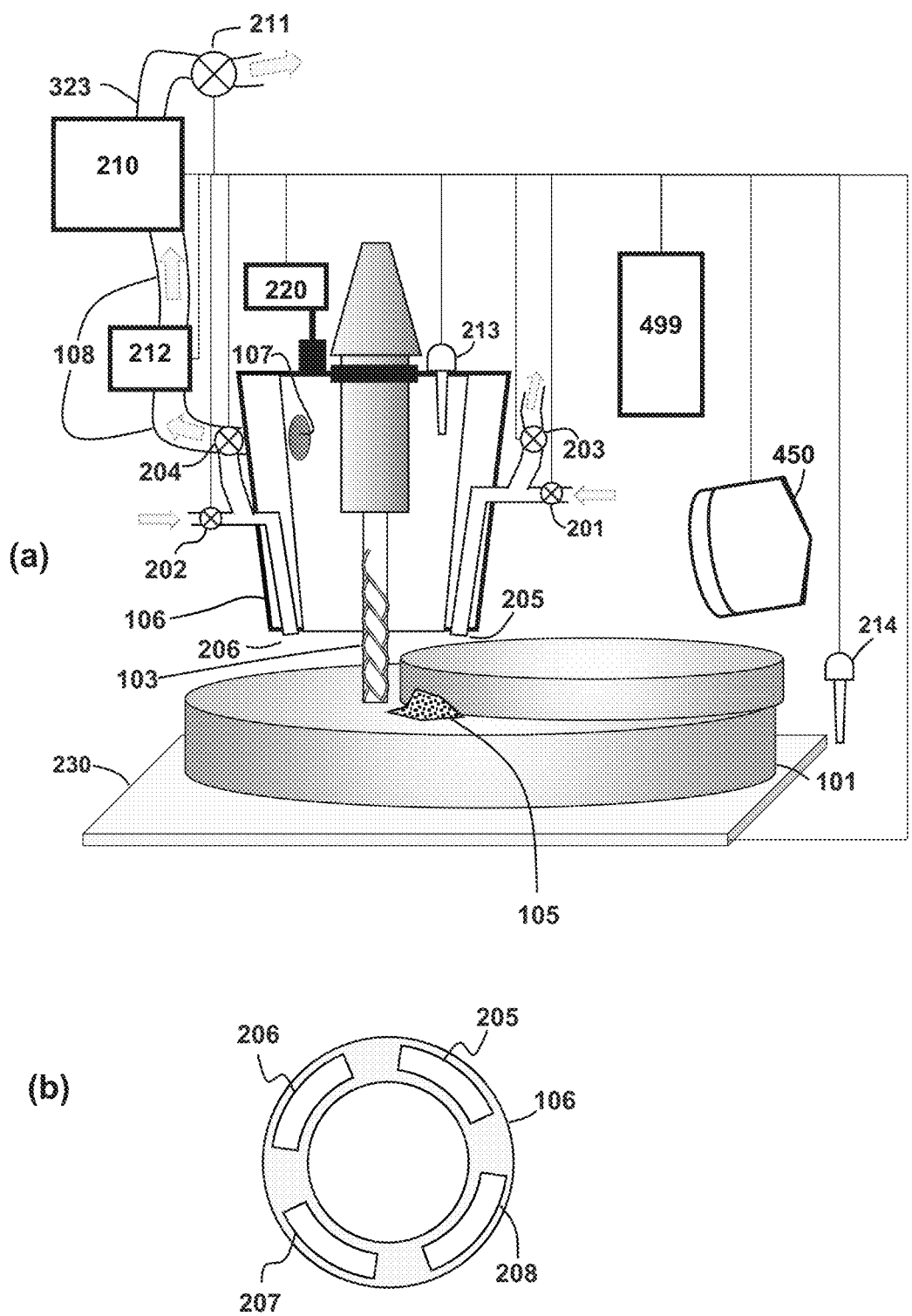
FIG. 2 depicts (a) a side view of a shroud for swarf extraction, and collection fitted with control and abatement. Air ports shown in (b) are arranged around the periphery of the shroud.

In an embodiment, shown in FIG. 2, shroud 106 is equipped with one or more ports 205, 206, 207, and 208 connected to a source of pressurized air through throttling valves, two of which are shown in FIG. 2(a) as 201 and 202, or exhaust vacuum and conduit 108 through one or more diverters in conjunction with throttling valves 201 and 202, two of which are shown in FIG. 2(a) as 203 and 204, and connected and controlled by a controller 499. The rate of evacuation through conduit 108 is controlled by exhaust throttling valve 211. The ports may be arranged around the periphery of the opening in the shroud 106 as shown in FIG. 2(b) and, optionally, directed substantially at the manipulation area where, in the exhibited case of machining, the tool 103 is generating swarf. A camera system 450 connected to controller 499 is used to spot or detect potential buildup of swarf. Flows through ports selected for the most advantageous approach to the work area may be then adjusted or pulsed in order to free swarf from potential trouble spots which may be prone to trapping the swarf such as settled cluster 105. Based on this detection of buildup of swarf by the camera, the controller may adjust flow of the pressurized air through the one or more ports. Alternatively, some of the ports may be configured via throttling valves and diverters as exhaust and some of the ports as pressured air so as to create a cross flow across the work surface and transverse of tool 103 which is generating swarf. In an embodiment, an actuator 220 is linked to and actuates motion of the shroud 106 and port assembly thereby changing the extension E relative to the shroud diameter D. Finally, it will be understood that a person of skill in the art will recognize that many other configurations of valves, ports, conduits, and diverters to achieve flow patterns advantageous for swarf removal are evident within the bounds of this disclosure.

Figure 3:
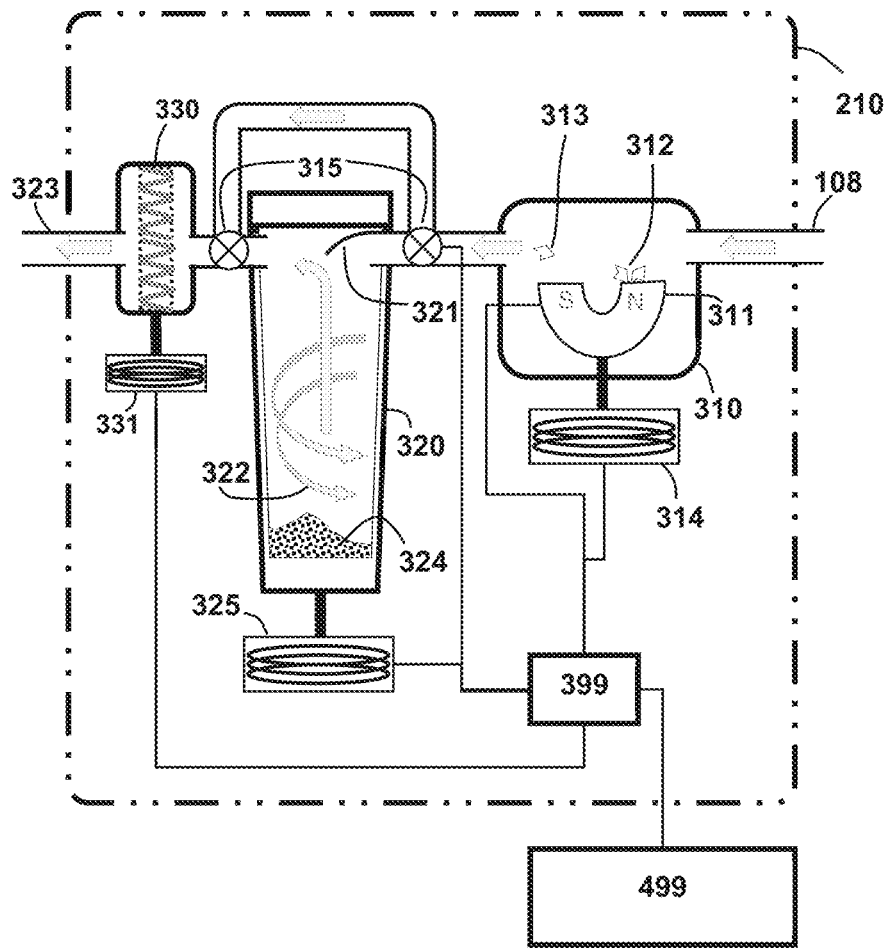
FIG. 3 depicts a swarf collection and abatement system.

FIG. 3 depicts a collector 210. In an embodiment, collector 210 comprises a magnetic mass detection chamber 310. Flow entrained swarf from conduit 108 enters magnetic mass detection chamber 310 wherein is positioned a magnetic collector 311. Magnetic collector 311 comprises a single north pole or a single south pole of a magnet, both north and south poles of a single magnet, or multiple poles of a multiple pole magnetic array. The magnet or magnets may comprise permanent magnets, electromagnets, or electro-permanent magnets. Both electromagnets and electro-permanent magnets may advantageously be increased in strength, decreased in strength, set to zero strength, or reversed in polarity thereby allowing magnetic swarf to be collected, sorted, and released according to the mass, shape, and magnetism of the swarf particles and the rate of flow through the magnetic mass detection chamber 310. The type of part under fabrication and the methods and rate of manipulation of the subtractive processes being employed as well as the feedstocks used during the additive steps and the processes used in the transformative step will influence the mass, shape, and magnetism of the swarf particles. Some of the swarf particles 312 may thus pass directly through magnetic mass detection chamber 310 and some of the swarf particles 313 will be adhered to the magnetic collector 311. Magnetic collector 311 is coupled to scales 314 outside as shown, or inside, magnetic mass detection chamber 310 which in turn is connected to controller 499 via optional hub 399. Advantageously for control, multiple measurements from scales 314 may be combined to determine the instantaneous average magnetic mass capture rate as $$\left(\frac{M_{t2} - M_{t1}}{(t2 - t1)}\right)$$

where $M_{t1}$ and $M_{t2}$ are the masses measured at subsequent times t1 and t2.

In another embodiment, collector 210 comprises a gravitational swarf collection chamber 320. Flow entrained swarf from conduit 108 or from magnetic mass detection chamber 310 enters into swarf collection chamber 320 where it is diverted by a diverter 321 into a cyclonic pattern 322 around the inside walls of the dust collection chamber 320 and rising slowly through the middle of the chamber to exit at a port 323 where a vacuum is applied. The flow pattern both slows the velocity and increases the path length of the flow and thereby gives increased opportunity for the swarf particles to fall under the influence of gravity and collect and remain trapped at a bottom 324 of the gravitational swarf collection chamber. Scales 325 measure the mass, or the increase in mass, of the collected swarf 324 and send the results of measurements to controller 499 via hub 399, or directly to controller 499. Advantageously for control, multiple measurements from scales 325 are combined to determine the instantaneous average gravitational capture rate as $$\left(\frac{M_{t2} - M_{t1}}{(t2 - t1)}\right)$$

where $M_{t1}$ and $M_{t2}$ are the masses measured at subsequent times t1 and t2.

In another embodiment, collector 210 comprises a filtration collection chamber 330. Flow entrained swarf from conduit 108, from magnetic mass detection chamber 310, from gravitational swarf collection chamber, or from bypass 315 enters into swarf filtration collection chamber 330 where it is collected by a fine particle filter such as one or more of the many varieties of High Efficiency Particulate Air (HEPA) filter. Scales 331 measure the mass, or the increase in mass, of the swarf collected in the chamber 330 and send the results of measurements to controller 499 via hub 399, or directly to controller 499. Advantageously for control, multiple measurements from scales 325 are combined to determine the instantaneous average filtration capture rate as $$\left(\frac{M_{t2} - M_{t1}}{(t2 - t1)}\right)$$

where $M_{t1}$ and $M_{t2}$ are me masses measured at subsequent times t1 and t2. Bypass 315 is controlled by controller 499 via hub 399, or directly by controller 499 allows occasional sole use of the filtration collection chamber for when low latency or very accurate swarf generation monitoring is required. Such low latency monitoring may alternately be referred to as monitoring in real time or real time monitoring. Otherwise, collection system 210 would ordinarily include passage through the gravitational swarf collection chamber 320.

In an embodiment, gravitational swarf collection chamber 320 may integrate a filter whereby, advantageously, all swarf trapped by filtration collection and by gravitational collection may be weighed on only the scales 325 whether or not it has yet settled on the filter or at the bottom of the chamber. It should be noted further that there is no delay in registration of the mass of newly introduced swarf once it has entered into the said combined filter and gravitational collection system chamber 320 since the mass of all swarf and entrained air minus air displaced by swarf will be measured on scales 325.

Figure 4:
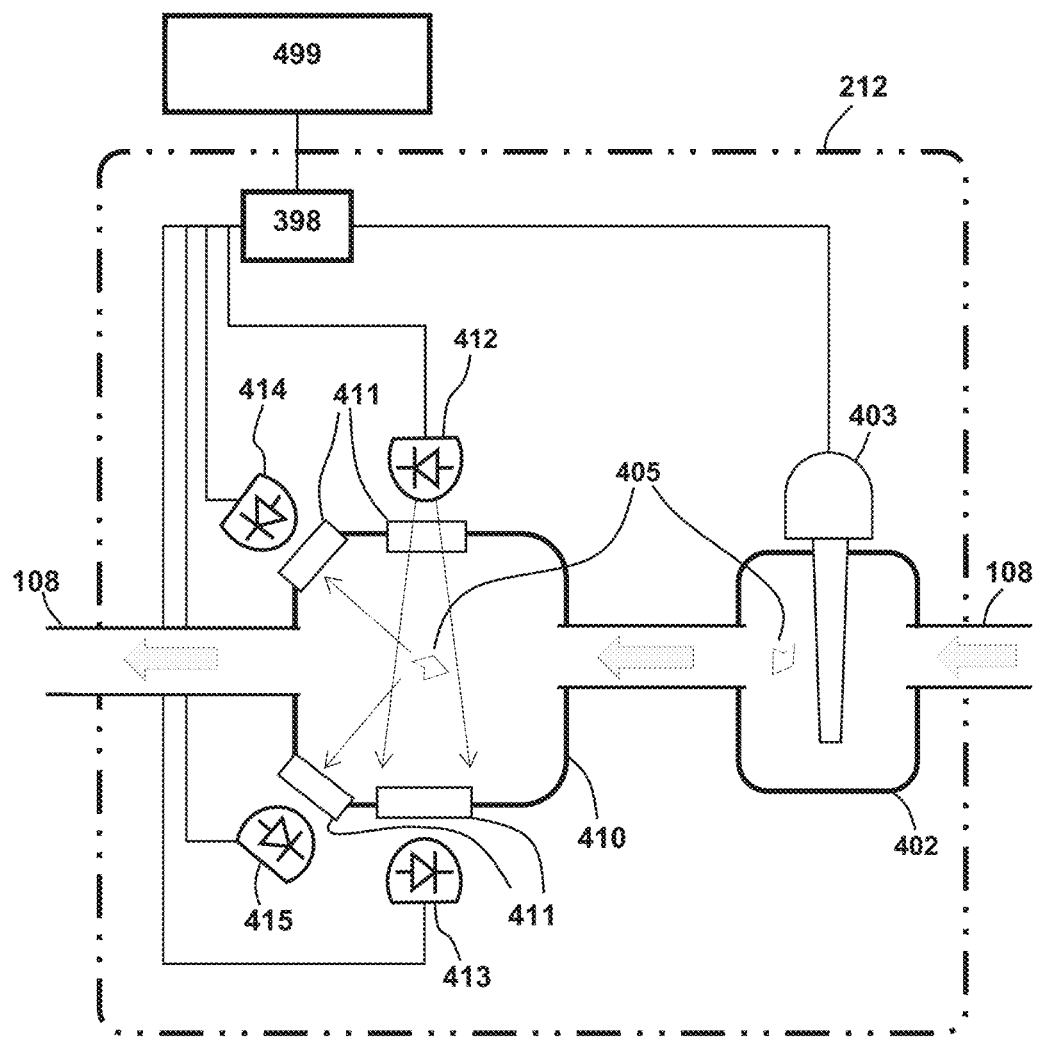
FIG. 4 shows a swarf detection system.

In an embodiment shown in FIG. 4, swarf evacuated through the shroud 106 by way of first port 107 and one or more air ports 205, 206, 207, and 208 into conduit 108 is directed into detection system 212 which has the capability to monitor in near real time the quantity and type of swarf collected and the rate of swarf collection. Positioning detection system 212 within the conduit 108 and immediately after said ports gives the advantage of assuring that all evacuated swarf may be accounted for as it flows into detection system 212.

In an embodiment of detection system 212, swarf entrained in flow through conduit 108 enters an inductive particle detection chamber 402 fitted with a protected probe inductive particle sensor 403 such as the PMS Particulate Sensor available from Dwyer, Inc. of Michigan City, IN. The sensor operates on the principle that particles in motion near a protected probe drive minute currents, and thereby a measurable voltage, through electromagnetic induction. This induced voltage may be calibrated against other direct measurements of mass. The sensor may be pre-calibrated from the manufacturer, or it may be calibrated against mass measurements obtained via collector 210, or it may be calibrated from milling a known mass of material from a sample and it will be apparent to those of sufficient skill that other methods of calibration are possible. Sensor 403 is controlled by, and sensor information is passed to, controller 499 via hub 398, or directly by and to controller 499. Further, since the induction sensor responds in a monotonically increasing fashion to increasing amounts of particles, it is possible to sidestep calibration and simplify the control process whereby flow rates are increased until further increases in flow rate do not result in increased particle detection.

In an embodiment of detection system 212, flow entrained swarf enters optical detection system comprising optical detection chamber 410 fitted with windows 411 which allow detection light to pass through. Although detectors are positioned behind windows in the embodiment, detectors may be positioned within the walls of the chamber or inside the chamber in alternate embodiments. Light source 412 directs light through a said window in detection chamber 410 where the light may interact with swarf particles 405. Some of the directed light may pass through detection chamber 410 not substantially diverted by interaction with swarf and exit through another window 411 in chamber 410. As the concentration, size, shape, and composition of swarf entrained through conduit 108 varies, more or less light from source 412 will reach source light detector 413 having been scattered or absorbed by the swarf. Thus, light detector 413 provides a way to determine light attenuation caused by swarf through its connection to controller 499 via optional hub controller 399, or directly to controller 499. Some of the light from light source 412 that is attenuated by scattering and not absorption from swarf may be detected by backscatter detector 414 positioned behind a window 411. Light so scattered in a substantially backwards direction is sometimes termed back scattering and light scattered but only marginally deviated is sometimes called forward scattering. Light detected by forward scattering detector 415 positioned behind a window 411. Detectors 414 and 415 are connected to controller 499 via optional hub 399, or directly to controller 499 thereby providing a measure of light scattered by swarf 405 entrained in flow through conduit 108. Signal streams from detectors 413, 414, and 415 are combined to ascertain particle count, particle flow rate, particle size distribution, and particle composition. The optical detection system may be calibrated against mass measurements obtained via collector 210, or it may be calibrated from milling a known mass of material from a sample and it will be apparent to those of sufficient skill that other methods of calibration are possible. As in the case of the protected probe inductive particle sensor 403, it is possible to sidestep calibration and simplify the control process with an optical detection system whereby flow rates are increased until further increases in flow rate do not result in increased particle detection.

In an embodiment, sensors 213 and 214 are positioned within the shroud 106 and outside of the work area, and collect signals A and B, respectively, to controller 499. Sensors 213 and 214 may be a protected probe inductive particle sensor such as 403; optical detection systems described in a previous embodiment; or other sensors that measure a particle concentration. Flows are increased so as to increase the swarf collection power and thereby amount of swarf collected. Signals A and B may be considered singly, jointly, or the ratio $$\frac{A}{B}$$

as a super signal. As swarf collected reaches near the point of all swarf generated, signals A, $$\frac{A}{B},$$

and B will increase, increase, and decrease, respectively, until a point of saturation where further increases of collection power, e.g. flows, does not produce further increase, increase, and decrease in signals A, $$\frac{A}{B},$$

and B, respectively, after which flows can be set for a duration, or collection rates may be dithered to determine rate of change of said signals to flow, or by several other methods of setting and control that will be apparent to a person of sufficient skill in the relevant arts.

Control and calibration of the said one or more throttling valves 201, 202, and others, diverters 203 and 204 and others, and exhaust throttling valve 211 may be by digital software computer algorithm which resides and executes on controller 499, said controller comprising a computer system. Alternatively, a digital software algorithm may reside and execute on a remote computer system that is part of a network which the controller 499 is in communication with, and may be directed by, said remote computer system. The controller may automatically adjust the throttling valves according to the build program running under computer numerical control on controller 499. In an embodiment, flow through air ports operating in the vicinity of large or small gaps between the shroud opening and the part may be adjusted up or down by adjusting throttling valves 201, 202, and others, diverters 203 and 204, and others, and the exhaust throttling valve 211 be adjusted up or down according to a model of expected and needed airflows required to optimize swarf removal and collection into the shroud.

Figure 5:
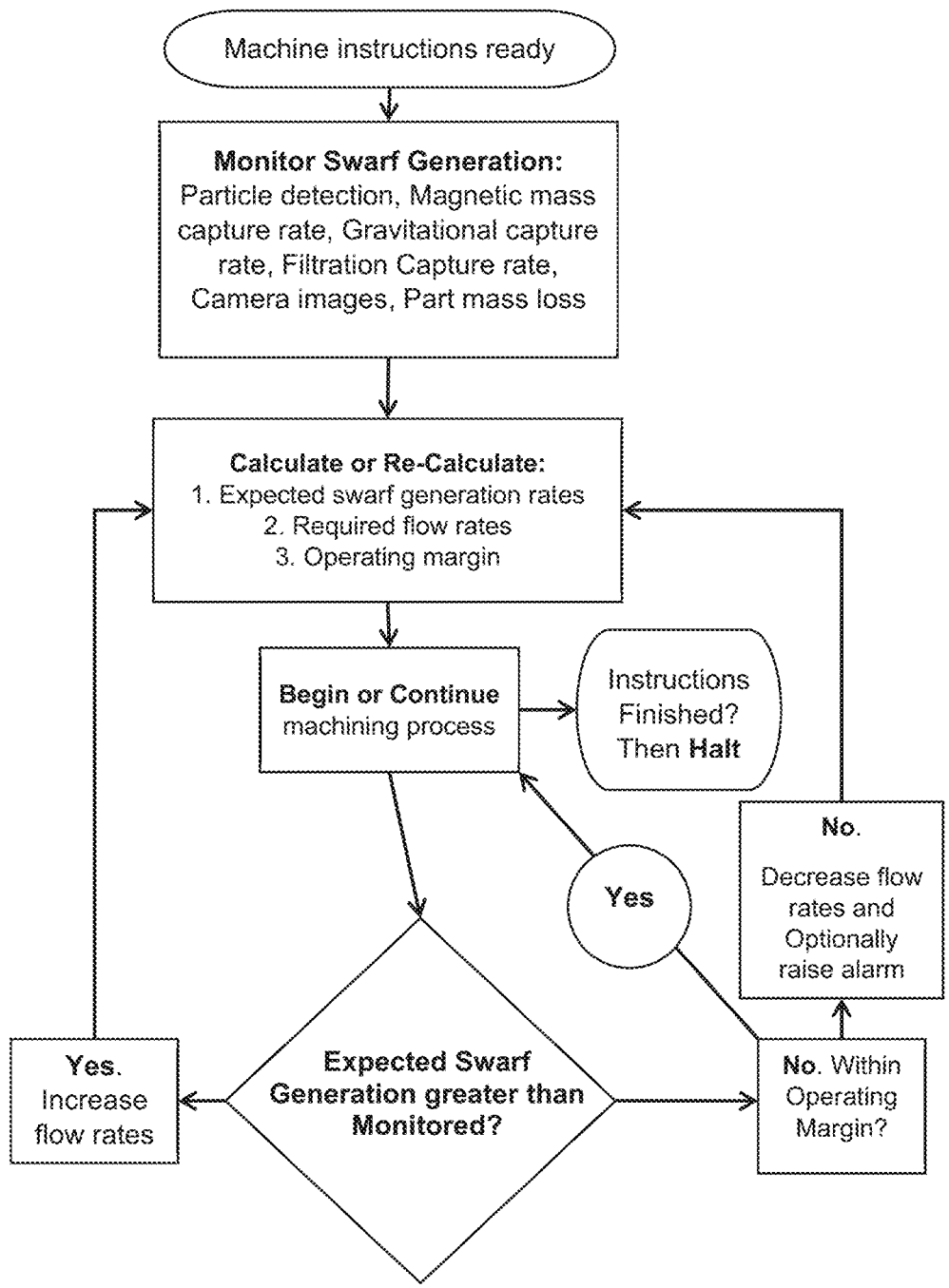
FIG. 5 shows a process for control of swarf collection and removal during the manipulative step of hybrid additive and subtractive manufacturing.

An embodiment comprises a control scheme as depicted in FIG. 5 as follows; Once machine instructions are ready for a manipulation step in the hybrid process, acquisition of monitoring data is begun including flow rates, capture rates, particle detections, camera images, and part mass loss. Then a swarf generation model of the part being built encompassing the additive steps e.g. dispensing, the transformative steps e.g. drying, and the manipulation steps e.g. machining, is used to calculate a set of expected swarf generation rates. The swarf generation model may encompass both calculated and measured quantities or masses of material added e.g. by dispensing, transformed e.g. by drying away solvents, and manipulated e.g. by machining. Calculation may be by a variety of methods such as calculating the added volume or mass of a layer or some portion of a part, the change of mass expected during the transformation e.g. the amount of solvent to be removed from the added volume, and the mass of transformed material to be removed during manipulation to achieve the final form of said part or portion of part. Measurement may be by a variety of methods such as measuring, for example, the mass of material dispensed during addition, measuring, for example, the amount of solvent removed during transformation, and measuring, for example, the mass of material removed during fabrication of the said part or portion of part. For purposes of measuring the mass of material gained during addition, lost or gained during transformation, and lost or gained during manipulation, part 101 under fabrication resides on scales 230 which is connected to controller 499 as depicted in FIG. 2. A set of required flow rates are calculated from said swarf generation model and a model of the performance of the particular mechanical arrangement of the shroud 106, ports 205, 206, 207, 208, and others, the collector 210 and the exhaust system comprising 107, 108, and exhaust throttling valve 211, throttling valves 201, 202, and other, and diverters 203, 204, and others. An operating margin is determined within which required air flow rates are deemed suitable for operating with process parameter adjustment. The manipulative step, e.g. machining process, is started and the monitoring data is compared to the expected swarf generation plus design bias. If less swarf is detected than expected, or if the camera spots accumulation of swarf on the part, the process flows need to be increased and the model appropriately adjusted. Camera system 450 spotted swarf may indicate interrupting the normal part processing for removal if possible and deemed necessary. If more swarf is detected than expected but within the operating margin then processing continues without adjustment to the process flows or model, and if swarf is detected in excess of the expected amount plus the operating margin, flows may be too high and need to be decreased and the model appropriately adjusted. Additionally, very excessive swarf flows may indicate a significant and unexpected process excursion and an alarm may be raised or the process can be halted otherwise the process proceeds until the manipulation, e.g. machining, step instructions are completed. In several embodiments, the adjustment of flows and model may happen continuously, quasi-continuously, intermittently, at predetermined times e.g. every few seconds, at predetermined points e.g. between layers or cycles of addition, transformation and manipulation, part to part such as during multiple piece part fabrication, or any combination comprising the aforementioned ways.

Figure 6:
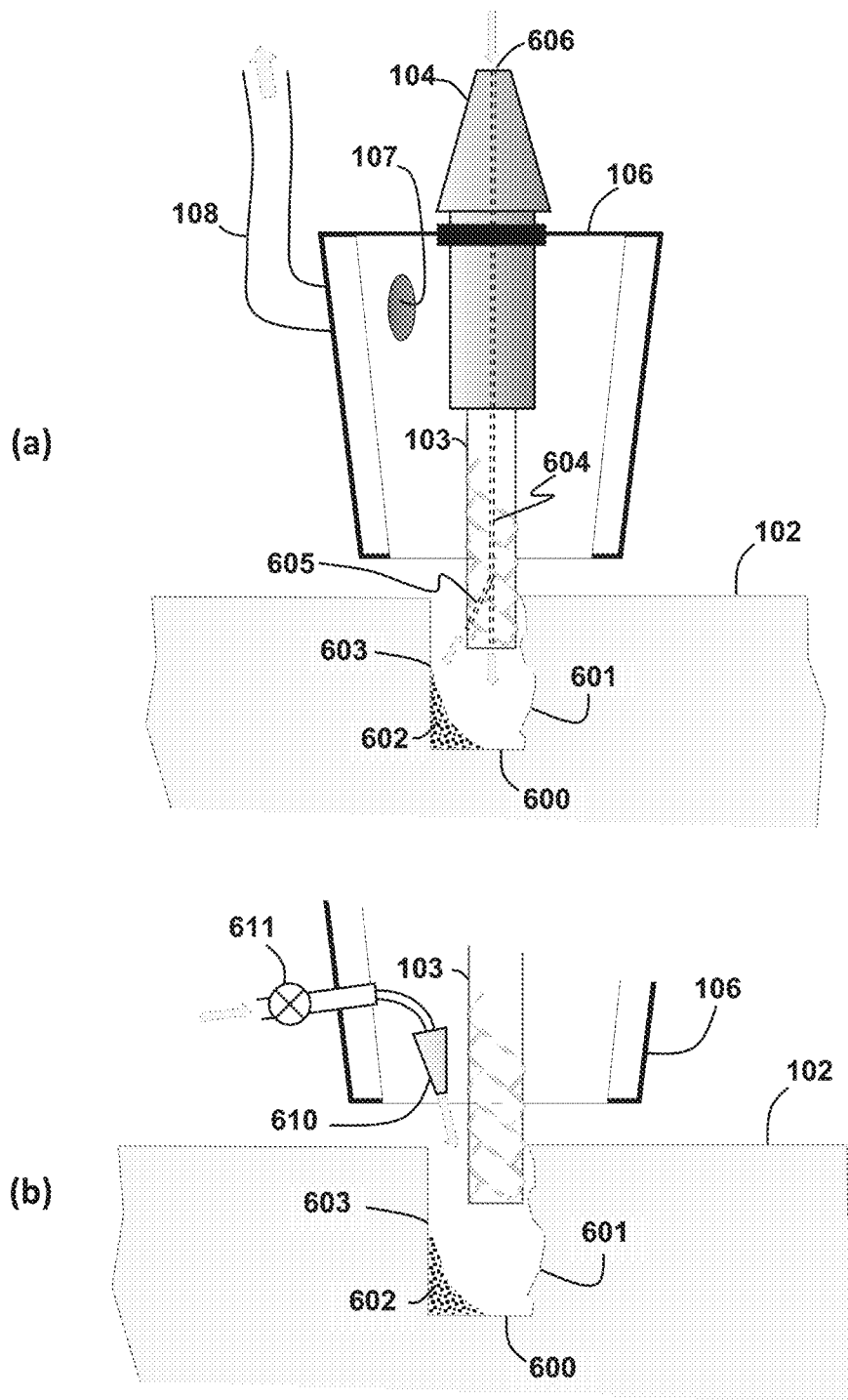
FIGS. 6(*a*) and (*b*) depict a side view of swarf extraction and collection with pressured air delivered to a recess feature by various pressurized air conduits.

In an embodiment, depicted in FIG. 6(a), tool 103 is milling into a recessed feature 600 such as a blind trench or hole in order to finish a rough edge 601 in top portion 102 of a part undergoing hybrid additive and subtractive fabrication. This action may create a swarf cluster 602 to settle against a previously finished surface 603 and become trapped due to the lack of air circulation in the recessed feature 600. In the embodiment, tool 103 is advantageously equipped with internal air conduits 604 and 605 which are fed with pressurized air through a rotational feedthrough a seal 606 in holder 104. As the tool mills, pressurized air flows out of the tool within the recessed feature thereby creating turbulent air currents which lift swarf from the recessed feature and force the swarf toward the opening of shroud 106. Negative pressure inside said shroud caused by a negative relative pressure applied through port 107 through conduit 108 creates a collecting action. The air flows within the recess combined with said collecting action advantageously remove and prevent the formation of swarf clusters 602.

In another embodiment, shown in FIG. 6(b), a nozzle 610 positioned within shroud 106 is supplied with pressurized air through throttling a valve 611 and directed substantially at the work area represented by surface 601 undergoing milling by tool 103. In a similar way to a previous embodiment shown in FIG. 6(a), air flows within the recess feature 600 combined with the collecting action of shroud 106 prevents the formation of swarf cluster 602 against finished surface 603. It will be apparent to a person of sufficient skill in the subject matter that there are many other possible configurations of this embodiment. For example, in certain embodiments, residue removal may be completed after one or more machining steps. Additionally, alternate embodiments may include nozzles in any combination of configurations described in previous embodiments herein. One or more cameras may detect whether all residue has been removed and thus determine whether the residue removal may continue or be stopped.

In a related embodiment, any residual swarf clusters 602 trapped in recessed feature 600 is removed by pressurized air fed through ports 205/206/207/208, conduits 604/605 or nozzle 610 after the milling step and before dispensing the next layer of sinterable paste. This swarf removal step may be performed in addition to the swarf removal during the milling step. The swarf removal step may be performed by rastering shroud 106 across the entire surface of the part or just in areas of the part where swarf clusters 602 are expected to form based on the swarf generation model. The swarf removal step may be performed in response to swarf clusters 602 spotted by the camera system 450 connected to the controller 499.

Figure 7:
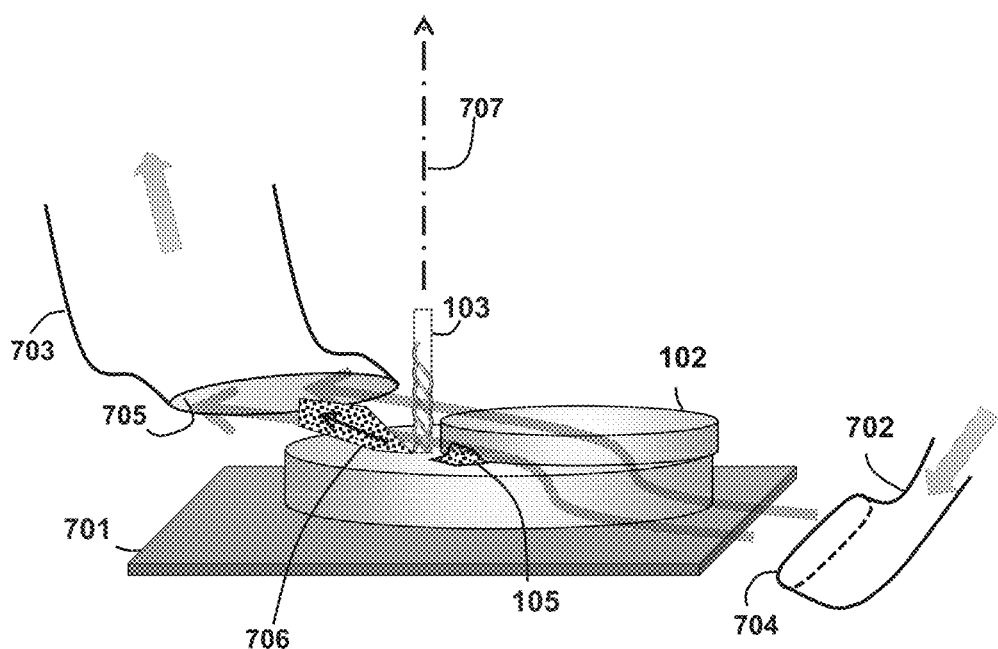
FIG. 7 shows swarf removal from a part via two ports orientable around a part being manipulated by a tool.

In an embodiment shown in FIG. 7, part 102 resting on a build plate 701 is undergoing the manipulative step in a hybrid additive and subtractive manufacturing process. Tool 103 is creating swarf, which for various particular geometries of part and tool may result in accumulated clusters of swarf 105 and jet of ejected swarf 706. A port 705 is positioned so the jet 706 flows substantially into port 705 and port 705 opens to a duct 703 which would lead onto conduit 108 of FIG. 2 comprised with collector 210 and detection system 212 of FIG. 3 and FIG. 4 respectively, for purposes of swarf collection, detection, and abatement. Air is supplied from port 704 via duct 702 oriented opposite port 705 and duct 703 with tool 103 and part 102 positioned substantially on a line between ports 704 and 705 such that airflow sweeps over part 102 where tool 103 generates and ejects swarf. In an embodiment, ports 704 and 705 may be oriented and rotated about axis 707 of tool 103, which advantageously allows interception of jet 706 independent of part 102 geometry or tool 103 orientation relative to the part 102 and also allows airflows to be optimized in places where swarf cluster 105 may accumulate. In addition to orientation about tool axis 707, ports 704 and 705 may translate "up" or "down" in the direction of tool axis 707. Alternatively, ports 704 and 705 may be stationary and build plate 701 may rotate and translate in a plane perpendicular to tool axis 707 and translate in the direction of tool axis 707. In a further alternative embodiment, both the ports 704 and 705 and the build plate 701 may allow some or any of the above described types of motion so as to further allow flexibility and optimize airflow across part 102 to facilitate removal of swarf.

Figure 8:
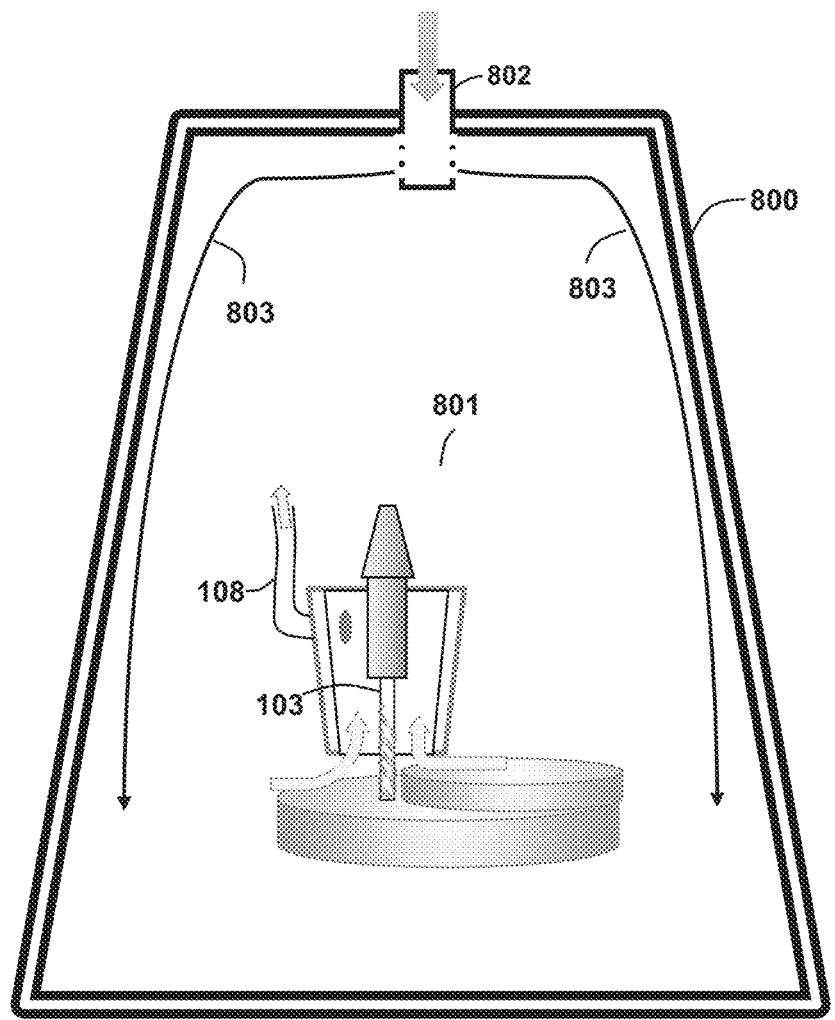
FIG. 8 shows laminar flow used to contain swarf generated in the manipulation step of a hybrid additive and subtractive manufacturing process.

In an embodiment depicted in FIG. 8, a fabrication chamber 800 houses a fabrication system 801 comprising exhaust conduit 108 and tool 103 which is generating swarf during the manipulation step of hybrid additive and subtractive manufacturing. As air and swarf are evacuated via conduit 108, a negative pressure or relative vacuum is established within fabrication chamber 800. Chamber 800 is substantially sealed so that negative pressure prevents swarf from escaping, however make up air may be drawn in through an inlet baffle 802 which has a series of orifices within the chamber such that a laminar flows 803 is established along the inner walls of chamber 800. In this way, swarf is advantageously prevented from escaping into the environment and all swarf may be detected, measured, collected and abated via detection systems 212 and collection system 210.

It will be clear to a practitioner with ordinary skill in the art that many other extensions and configurations in addition to the preferred embodiments are possible and exemplification of these preferred embodiments herein does not preclude these other embodiments for the purposes of this disclosure.

We claim:

1. An assembly for controlling waste material during hybrid subtractive and additive manufacturing, the assembly comprising:
    a machining tool held in a tool holder;
    a shroud disposed around the machining tool;
    a first port that is formed in a wall of the shroud, wherein negative pressure within the shroud is caused by applying pressure through the first port via a conduit, and wherein swarf is evacuated through the shroud into the conduit;
    one or more air ports that are connected to a source of pressurized air by one or more throttling valves;
    a controller that controls a rate of evacuation; and
    a camera connected to the controller to detect a buildup of the swarf,
    wherein the controller, based on detection of the buildup of the swarf by the camera, is configured to adjust flow of the pressurized air through the one or more air ports by automatic adjustment of the one or more throttling valves, and wherein the automatic adjustment of the one or more throttling valves is in accordance to a build program that runs on the controller.

2. The assembly of claim 1, wherein the shroud comprises the one or more air ports.

3. The assembly of claim 1, wherein the shroud, the machining tool, and the tool holder form a swappable assembly.

4. The assembly of claim 1, further comprising a collector connected to the first port by the conduit, the collector being configured to collect, sort, and release the swarf.

5. The assembly of claim 4, wherein the collector comprises a magnetic mass detection chamber.

6. The assembly of claim 4, wherein the collector comprises a filtration swarf collection chamber.

7. The assembly of claim 4, wherein the collector comprises a gravitational swarf collection chamber.

8. The assembly of claim 4, further comprising a particle detection chamber having one or more sensors configured to detect in real time a concentration, a size, a shape, and/or a concentration of the swarf.

9. The assembly of claim 8, wherein the one or more sensors are connected to the controller, and wherein the controller is configured to adjust the one or more throttling valves.

10. The assembly of claim 1, further comprising a seal disposed between a portion of the shroud and a portion of the tool holder.

11. A method of containing waste material during hybrid subtractive and additive manufacturing with the assembly for controlling waste material of claim 1, the method comprising:
providing the assembly for controlling waste material of claim 1;
adding an amount of material to a part being additively manufactured;
transforming the amount of material that was added;
manipulating the machining tool to machine a portion of the part being additively manufactured, thereby generating swarf;
sealing a portion of the machining tool and covering a portion of the part being additively manufactured with the shroud; and
applying a negative pressure via the first port in the shroud to create an airflow to prevent the swarf from exiting the shroud.

12. The method of claim 11, further comprising detecting the buildup of the swarf by the camera.

13. The method of claim 12, further comprising adjusting the flow of the pressurized air via the controller, wherein the controller controls the one or more throttling valves, and wherein the adjusting is based on the buildup of the swarf detected by the camera.

14. The method of claim 13, further comprising determining, within a collector, a size, a shape, and/or a concentration of the swarf.

15. The method of claim 14, wherein the collector comprises a magnetic mass detection chamber, a gravitational swarf collection chamber, a filtration collection chamber, or a combination thereof.

16. The method of claim 14, further comprising monitoring in real time, by a detection system comprising sensors, a rate, a quantity, and/or a type of the swarf collected.

17. The method of claim 14, further comprising determining a set of expected swarf generation rates using a swarf generation model, wherein the swarf generation model is based on calculated and/or measured quantities of the material added and/or subtracted from the part.

18. The method of claim 17, further comprising determining an operating margin using a set of air flow rates calculated based on the expected swarf generation rates, the swarf generation model, a mechanical arrangement of the shroud, or a combination thereof.

19. The method of claim 18, further comprising adjusting the airflow and the swarf generation models based on a detection of swarf outside of the operating margin.

20. The method of claim 18, further comprising raising an alarm based on the detection of swarf outside of the operating margin.

21. The method of claim 11, further comprising flowing the pressurized air through one or more conduits, the one or more air ports, or a combination thereof, wherein the pressurized air is directed toward the part.

22. The method of claim 21, wherein the one or more conduits or the one or more ports are located in the shroud.

* * * * *